(12) United States Patent
Fisher

(10) Patent No.: US 11,956,509 B1
(45) Date of Patent: Apr. 9, 2024

(54) LIVE EVENT POLLING SYSTEM, MOBILE APPLICATION, AND WEB SERVICE

(71) Applicant: Steven Fisher, Inglewood, CA (US)

(72) Inventor: Steven Fisher, Inglewood, CA (US)

( * ) Notice: Subject to any disclaimer, the term of this patent is extended or adjusted under 35 U.S.C. 154(b) by 121 days.

(21) Appl. No.: 17/721,223

(22) Filed: Apr. 14, 2022

Related U.S. Application Data

(60) Provisional application No. 63/174,965, filed on Apr. 14, 2021.

(51) Int. Cl.
*H04N 21/431* (2011.01)
*H04N 21/2187* (2011.01)
*H04N 21/472* (2011.01)
*H04N 21/4788* (2011.01)

(52) U.S. Cl.
CPC ..... *H04N 21/4788* (2013.01); *H04N 21/2187* (2013.01); *H04N 21/4316* (2013.01); *H04N 21/472* (2013.01)

(58) Field of Classification Search
CPC .......... H04N 21/4788; H04N 21/2187; H04N 21/4316; H04N 21/472
See application file for complete search history.

(56) References Cited

U.S. PATENT DOCUMENTS

| | | | | |
|---|---|---|---|---|
| 9,578,377 B1* | 2/2017 | Malik | ...................... | H04N 21/84 |
| 10,477,271 B1* | 11/2019 | Higbee | ............... | H04N 21/2668 |
| 2002/0107965 A1* | 8/2002 | Piccionelli | ........... | H04N 21/812 |
| | | | | 709/225 |
| 2009/0063252 A1* | 3/2009 | Abhyanker | ............. | G06Q 30/02 |
| | | | | 705/7.34 |
| 2011/0199180 A1* | 8/2011 | Holman | .................. | G08C 17/00 |
| | | | | 340/4.42 |
| 2012/0191774 A1* | 7/2012 | Bhaskaran | .............. | H04H 60/33 |
| | | | | 709/203 |
| 2012/0246580 A1* | 9/2012 | Bouverat | ................ | G06Q 50/01 |
| | | | | 715/753 |
| 2013/0268951 A1* | 10/2013 | Wyatt | ..................... | H04H 60/33 |
| | | | | 725/5 |
| 2014/0211090 A1* | 7/2014 | Faratzis | .................. | H04N 5/445 |
| | | | | 348/563 |
| 2014/0343994 A1* | 11/2014 | Graff | ........................ | H04L 51/52 |
| | | | | 705/7.19 |
| 2016/0005057 A1* | 1/2016 | Zavala | ................ | G06Q 30/0203 |
| | | | | 705/7.32 |
| 2016/0188125 A1* | 6/2016 | Kaplan | .................. | G06F 3/0481 |
| | | | | 715/730 |
| 2017/0111418 A1* | 4/2017 | Warren | .................... | H04L 67/02 |
| 2017/0201724 A1* | 7/2017 | Galvin | ............. | G08B 13/19665 |
| 2018/0014077 A1* | 1/2018 | Hou | ....................... | H04N 21/458 |
| 2018/0063589 A1* | 3/2018 | Chand | ................ | H04N 21/6582 |
| 2018/0249206 A1* | 8/2018 | Drori | ................ | H04N 21/23418 |

(Continued)

*Primary Examiner* — Chris Parry
*Assistant Examiner* — Hassan A Khan
(74) *Attorney, Agent, or Firm* — Plager Schack LLP; Mark H. Plager; Stephen Hallberg

(57) ABSTRACT

A live event polling system is disclosed that provides passive engagement tools and micro-polling services during live events so that live event hosts and developers of virtual spaces can engage their audiences and collect valuable input and data more effectively and promote audience participation for sentiment sharing and data collection in ways that overcome conventional barriers, such as time and user participation, which exist to gaining verbal input during such live events.

15 Claims, 9 Drawing Sheets

(56) References Cited

U.S. PATENT DOCUMENTS

| | | | | |
|---|---|---|---|---|
| 2018/0280791 A1* | 10/2018 | Eno | ........................ | G07F 17/326 |
| 2019/0191529 A1* | 6/2019 | Magielse | ............. | H05B 47/155 |
| 2019/0296844 A1* | 9/2019 | Corder | ............. | H04N 21/43074 |
| 2021/0400142 A1* | 12/2021 | Jorasch | .................. | H04N 7/147 |
| 2021/0406850 A1* | 12/2021 | Herring | .................. | G06Q 30/08 |
| 2022/0392360 A1* | 12/2022 | Jaeh | ......................... | G09B 5/00 |
| 2022/0408122 A1* | 12/2022 | Khanna | .............. | H04N 21/4788 |
| 2023/0283854 A1* | 9/2023 | Mendell | ............. | H04N 21/2187 463/25 |

\* cited by examiner

LIVE EVENT POLLING SYSTEM, MOBILE APPLICATION, AND WEB SERVICE

CLAIM OF BENEFIT TO PRIOR APPLICATION

This application claims benefit to U.S. Provisional Patent Application 63/174,965, entitled "LIVE EVENT POLLING SYSTEM, MOBILE APPLICATION, AND WEB SERVICE," filed Apr. 14, 2021. The U.S. Provisional Patent Application 63/174,965 is incorporated herein by reference.

BACKGROUND

Embodiments of the invention described in this specification relate generally to audience engagement systems, and more particularly, to a live event polling system that is implemented as an application and a cloud-based web service.

Live in-person events, live-streaming events have no viable tools to collect wide participation audience sentiments during live events.

Virtual experiences and environments have no options for collecting audience sentiments during self-guided tours or exploring virtual spaces.

Therefore, what is needed is a way for live event hosts and developers of virtual spaces to engage their audiences and collect valuable input and data more effectively and promote audience participation for sentiment sharing and data collection in ways that overcome conventional barriers, such as time and user participation, which exist to gaining verbal input during such live events.

BRIEF DESCRIPTION

A novel live event polling system is disclosed. In some embodiments, the live event polling system that is implemented as an application and a cloud-based web service. In some embodiments, the live event polling system provides passive engagement tools and micro-polling services during live events so that live event hosts and developers of virtual spaces can engage their audiences and collect valuable input and data more effectively and promote audience participation for sentiment sharing and data collection in ways that overcome conventional barriers, such as time and user participation, which exist to gaining verbal input during such live events. In some embodiments, the live event polling system reduces friction to participation and sentiment sharing for audiences of live in-person, live-streaming, and virtual environments through a micro polling service that delivers small audience polls in-line with content. As an application and web service, the live event polling system allows participants to share valuable input with other audience members and event host during live or virtual events and experiences. In some embodiments, a live event is defined as a physical live event or streaming live event (or both).

In some embodiments, the live event polling system supports both live in-person events and live streaming events. In some embodiments, the live event polling system supports user anonymity concerns by both receiving anonymous and user identified responses. In some embodiments, the live event polling system supports polls scheduling for advance live in-content delivery. In some embodiments, the live event polling system includes an intuitive host's dashboard for customizing and publishing polls, recording, and analyzing data. In some embodiments, the live event polling system supports embedding polls into external, third-party applications, such as streaming services, email clients and virtual environments.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
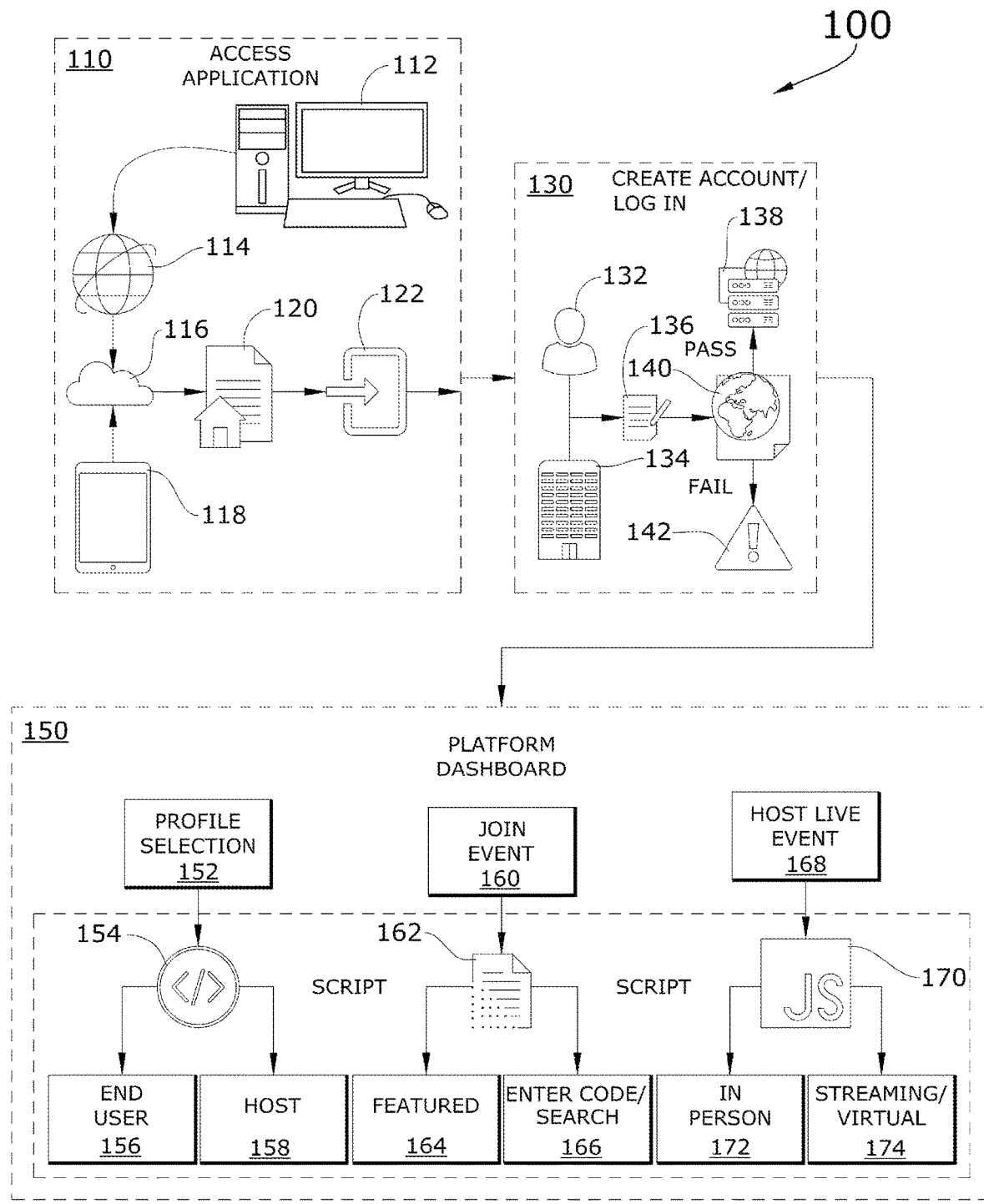
FIG. 1 conceptually illustrates a live event polling system and cloud-based web service to which users connect via a live event polling application in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a live event polling system that is implemented as an application and a cloud-based web service. In some embodiments, the live event polling system provides passive engagement tools and micro-polling services during live events so that live event hosts and developers of virtual spaces can engage their audiences and collect valuable input and data more effectively and promote audience participation for sentiment sharing and data collection in ways that overcome conventional barriers, such as time and user participation, which exist to gaining verbal input during such live events. In some embodiments, the live event polling system reduces friction to participation and sentiment sharing for audiences of live in-person, live-streaming, and virtual environments through a micro polling service that delivers small audience polls in-line with content. As an application and web service, the live event polling system allows participants to share valuable input with other audience members and event host during live or virtual events and experiences. In some embodiments, a live event is defined as a physical live event or streaming live event (or both).

As stated above, live in-person events, live-streaming events have no viable tools to collect wide participation audience sentiments during live events. In addition, virtual experiences and environments have no options for collecting audience sentiments during self-guided tours or exploring virtual spaces. Embodiments of the live event polling system described in this specification solve such problems by creating resources for conducting polls during live events, thereby allowing event hosts to more effectively engage guests and collect data. The live event polling system also creates an avenue for the public to provide feedback and input during live events.

Embodiments of the live event polling system described in this specification differ from and improve upon currently existing options. In particular, some embodiments differ because, prior to the creation of this live event polling system, no effective digital tool existed to capture input or gain insights from attendees of live events.

In addition, the existing, conventional methods require time and interest which precludes the participation of most guests. By contrast, the live event polling system described in this specification works through passive engagement and micro-polling to reduce barriers.

The live event polling system of the present disclosure may be comprised of the following elements. This list of possible constituent elements is intended to be exemplary only and it is not intended that this list be used to limit the live event polling system of the present application to just these elements. Persons having ordinary skill in the art relevant to the present disclosure may understand there to be equivalent elements that may be substituted within the present disclosure without changing the essential function or operation of the live event polling system.

1. Download and access the app.
2. Host or attend and event.
3. Host polls or contribute responses to polls.
4. Collect data.

The various elements of the live event polling system of the present disclosure may be related in the following exemplary fashion. It is not intended to limit the scope or nature of the relationships between the various elements and the following examples are presented as illustrative examples only. A person with a smart device with internet access (e.g., a smartphone, a tablet computing device, etc.) can download the application implementation of the live event polling system or access a website provided through a web application service implementation of the live event polling system. As a user of the application or website, the person interacts with a User Interface (UI) to access functions and services.

In some embodiments, the live event polling system supports both live in-person events and live streaming events. In some embodiments, the live event polling system supports user anonymity concerns by both receiving anonymous and user identified responses. In some embodiments, the live event polling system supports polls scheduling for advance live in-content delivery. In some embodiments, the live event polling system includes an intuitive host's dashboard for customizing and publishing polls, recording, and analyzing data. In some embodiments, the live event polling system supports embedding polls into external, third-party applications, such as streaming services, email clients and virtual environments.

In some embodiments, the live event polling system works by an application implementation and a web service implementation (hereinafter also referred to as "Opine App and Web Service"). The Opine App and Web Service is a live event micro-polling application and web service designed to assist event coordinators, meeting facilitators and live stream event host. The Opine App and Web Service enables live event host to effectively engage guest and gain real-time user insights through passive-engagement and micro-polling.

In some embodiments, micro polls can be developed within the Opine App and Web Service, which are single instant queries that can be used to poll audiences for opinions and votes. Micro polls differ from and are more effective than traditional polling tools and services in that micro polls are inherently single instance, meaning one question per content stage, completed in seconds, versus minutes required to complete polls using other services. Furthermore, unlike other polling services that are typically hosted externally, requiring users to leave hosted content to a visit a remote site for polling. The Opine App and Web Service allows for the integration of polls inline with content enabling on demand queries and data collection that flows with live content and is compatible with the most popular content delivery systems.

In some embodiments, a dashboard provides greater user control. Specifically, the Opine App and Web Service poll host's dashboard allows a host to view live content within the app or on the web, analyze data in various formats, create reports and can configured polls to be launched on-demand or at a predetermined targeted delivery time for more seamless integration with content, optimizing the user experience.

In some embodiments, the live event polling system leverages a passive engagement framework that includes event/listener background processing that is silent and concurrent with the public activity of all users of the system. Specifically, the Opine App and Web Service platform leverages passive engagement responses as a tool to reduce common barriers to collecting insights and gaining participation. This is an improvement over existing platforms, which are typically too time consuming, involve too many steps/requirements, fail to promote engagement, or overcome participant apprehension (e.g., fear of public speaking and/or sharing opinions), and generally ignore privacy concerns related to third-part data sharing. By contrast, the live event polling system of the present disclosure, as implemented by the Opine App and Web Service, provides a live event polling and data sharing solution that is brief, provides seamless delivery in-line with content, allows for passive responses (requires no overt participation), and respects user data sharing concerns (i.e., there is no third-party data sharing).

In some embodiments, the live event polling system allows a host to more effectively engage and interact with guest during live in-person events or events hosted via live streaming. In this way, the Opine App and Web Service improves user experience and increases user engagement, whether for live, in-person events or live streaming events. The Opine App and Web Service also reduces the amount of time and steps required for users to give and host to gain insights and the service seamlessly integrates with the host's preferred content delivery method. In addition, the Opine App and Web Service gives users the freedom and enjoyment of frictionlessly sharing of their thoughts and opinions, while allowing companies, organizations, and hosts to obtain data for improved the customer/client relations and user experience.

By way of example, FIG. 1 conceptually illustrates a live event polling system and cloud-based web service to which users connect via a live event polling application 100. As noted above, the cloud-based web service and the live event polling application are also referred to, collectively, as the Opine App and Web Service. In this figure, various aspects of user access to are shown including an access application 110 comprising a plurality of access mechanisms and viewable user interfaces for the initial user access to the cloud-based web service, aspects to create an account and log-in 130 for an individual 132 to become a registered user (or simply "user") to access and utilize the cloud-based web service, and a platform dashboard 150 of the cloud-based web service that is available after registration and user authentication.

The access application 110 shown for the live event polling system and cloud-based web service to which users connect via a live event polling application 100 includes different devices which a user can utilize to access the cloud-based web service and interact with the live event polling application. The devices shown in this figure include a conventional computing device 112 and a mobile device 118. The conventional computing device 112 is generally not considered a mobile device but may be a desktop computer, a laptop computer (which is arguably a mobile device in any case), or other computing device. The conventional computing device 112 connects to the internet 114 (either via a wired or wireless connection) to access a cloud web server 116 which hosts the cloud-based web service and provides the interface of the live event polling application. The mobile device 118 is a computing device with integrated communications (e.g., cellular, CDMA, other wireless, etc.) and computer processing power (via an embedded processor). Thus, the mobile device 118 may be a smartphone, a tablet computing device, a mobile handheld device or personal digital assistant (PDA) device, etc. The mobile device 118 may be utilized by the user to connect directly to the cloud web server 116, such as by a wireless connection over cellular, but may also connect to a WiFi router to access the internet 114 to make a transmission control protocol/internet protocol (TCP/IP) connection to the cloud web server 116 (similar to the conventional computing device 112). The user may be a live event participant who wishes to engage in live events and who may wish to submit polling information related to the live event. The user may alternatively be a live event creator/host who intends to create and publish queries to poll live event participants. Initially, the user is presented with a home page 120 user interface with a login/registration form 122 when connected to the cloud web server 116. If previously registered with an account, the user just logs in by inputting login credentials, such as username/password, or via another authentication mechanism, such as two factor authentication.

On the other hand, if the user is not previously registered, then the user is only considered an individual 132 who is not yet known (identity not authenticated). The individual 132 or a company/business 134 proceeds to a form 136 that is required to create an account and log-in 130 as a valid authenticated user. When completed, the form 136 is submitted and reviewed automatically by a validation script 140, resulting in either platform access 138 when the form passes the validation script 140 requirements or a failure notification 142 when the form does not pass the requirements of the validation script 140. If a failure notification 142 is output, the individual may return to the home page 120 to connect via the login/registration form 122 and proceed to input the information required in the form 136 for review by the validation script 140 again.

When the form 138 submitted to the validation script 140 is successful, then the user may access a platform dashboard 150 provided by the cloud-based web service. In the platform dashboard 150, the user may make a profile selection 152, join an event 160, or choose to host a live event 168. The profile selection 152 provides script access in HTML code 154 for either a regular end user 156 or a host 158 of a live event. For instance, the user may wish to manage his or her profile settings, such as alerts, notifications, biographical information, etc.

When the user makes a selection to join an event 160, a client script 162 runs to provide user access to featured events 164 and/or events retrievable by entering a code or searching for events 166. For example, the user may have a code to access an exclusive live streaming event and selects to enter the code 166, or the user may simply wish to search for events by keyword or look through a list of featured events that are ongoing or coming up soon.

When the user makes a selection to host a live event 168, a script that is written in java script 170, and therefore loads in a browser or mobile app, is launched and the user may further refine the live event by selection of a live in-person event 172 or a live streaming/virtual event 174 and proceed through options for creating and hosting the live event.

Figure 2:
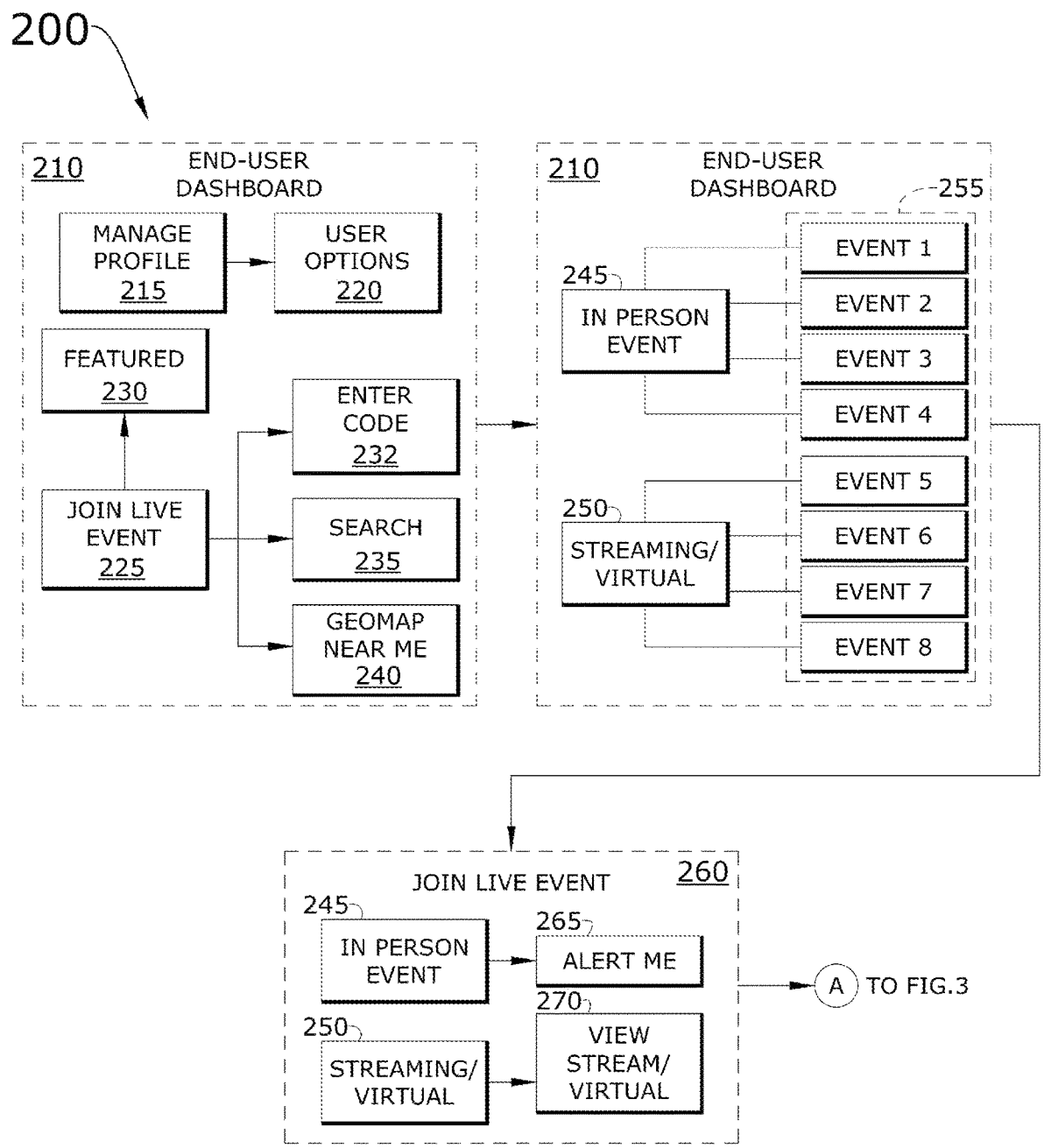
FIG. 2 conceptually illustrates a live event user process for accessing and joining live in-person events and live streaming events in some embodiments.

Turning to another example, FIG. 2 conceptually illustrates a live event user process for accessing and joining live in-person events and live streaming events 200 in some embodiments. As shown in this figure, the live event user process for accessing and joining live in-person events and live streaming events 200 is based on the user interacting with an end-user dashboard 210 of the live event polling application (whether the website, or web app, version of the live event polling application accessed via a web browser or the mobile app version of the live event polling application accessed via mobile device), thereby allowing the user to join a live event 260.

In some embodiments, the live event user process for accessing and joining live in-person events and live streaming events 200 manages a profile (at 215) when the user selects the option to manage the profile from the end-user dashboard 210. Then the live event user process for accessing and joining live in-person events and live streaming events 200 presents several user options (at 220) for the user to manager their profile. On the other hand, the live event user process for accessing and joining live in-person events and live streaming events 200 allows for user selection to join a live event (at 225), which presents different ways for the user to join a live in-person event or a live streaming/virtual event. The live event user process for accessing and joining live in-person events and live streaming events 200 shows featured live events ("featured" at 230) when the user selects an option to filter the live events to join based on those which are currently featured. The live event user process for accessing and joining live in-person events and live streaming events 200 also allows the user to join a live event (at 225) by entering a code ("enter code" at 232), performing a live event search ("search" at 235), or mapping live events in a geospatial area nearby the user ("geomap near me" at 240) which is based on location data of user's mobile device in some embodiments or user-provided location data. Furthermore, the user may combine multiple, different filtering options (by successive selections of a combination of "featured at 230", "enter code at 232", "search at 235" based on keyword(s) or filter options, and/or "geomap near me at 240") to limit the number of live events shown for the user to select to join.

After filtering the available live events to which the user may join (by selecting "featured at 230", "enter code at 232", "search at 235" based on keyword(s) or filter options, and/or "geomap near me at 240"), the user interface remains the same. That is, the user remains in the end-user dashboard 210 to select either an in-person event (at 245) or a streaming/virtual event (at 250). Depending on the selection of the in-person event (at 245) or the streaming/virtual event (at 250), as well as the prior filtering selections (i.e., the selections of a combination of "featured at 230", "enter code at 232", "search at 235" based on keyword(s) or filter options, and/or "geomap near me at 240") to join a live event (at 225), a number of live events are presented (at 255) for user selection. In this example, the live event that are presented (at 255) include eight events. However, this is merely an example, and therefore, there may be fewer than eight or a number of events greater than eight in any given scenario. Nevertheless, by clicking on one of the live events from the number of live events that are presented (at 255) for either the in-person live event (at 245) of the streaming/virtual live event (at 250), the live event user process for accessing and joining live in-person events and live streaming events 200 live event user process for accessing and joining live in-person events and live streaming events 200 then proceeds to join the live event (at 260).

As shown in the step for joining the live event (at 260), the in-person live event (at 245) option provides a user parameter that can be configured to "alert me" (at 265) before the in-person live event starts (referred to as the "alert me user parameter"). Similarly, the streaming/virtual live event (at 250) option provides a user option to view a streaming video of the streaming/virtual live event (at 270). After these selections are completed, the user moves forward to provide input related to sentiments for the live event, which is described next, by reference to FIG. 3.

Figure 3:
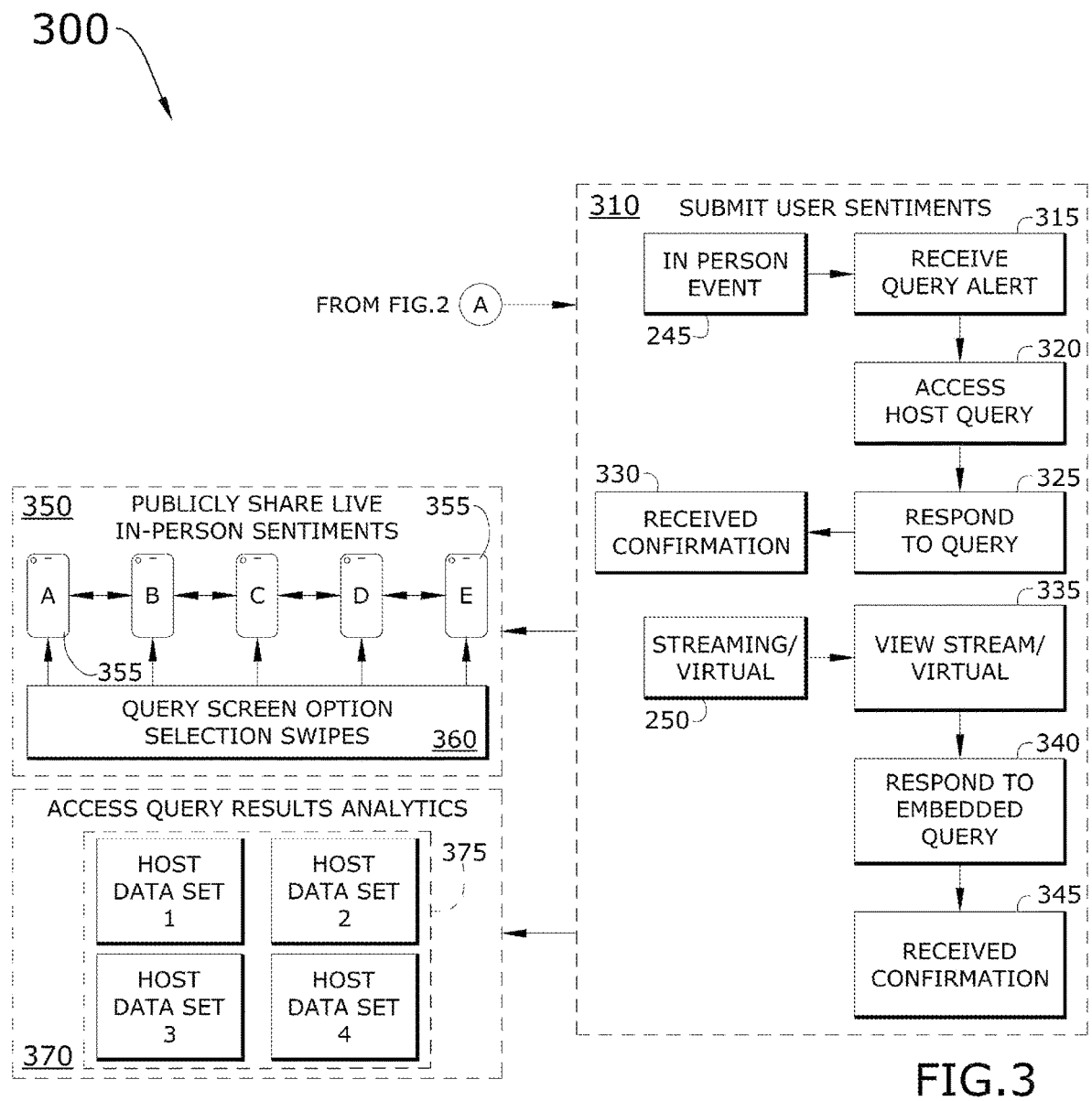
FIG. 3 conceptually illustrates a live event user sentiment query and submission process for querying, submitting, and sharing live in-person sentiments during live in-person events and live streaming events in some embodiments.

Specifically, FIG. 3 conceptually illustrates a live event user sentiment query and submission process for querying, submitting, and sharing live in-person sentiments during live in-person events and live streaming events 300 in some embodiments. As shown in this figure, the live event user sentiment query and submission process for querying, submitting, and sharing live in-person sentiments during live in-person events and live streaming events 300 starts to submit user sentiments (at 310) by picking up from where the live event user process for accessing and joining live in-person events and live streaming events 200 of FIG. 2 left off.

In particular, to submit user sentiments (at 310) when the user has selected the in-person live event (at 245) and set the alert me parameter (at 265), then the live event user sentiment query and submission process for querying, submitting, and sharing live in-person sentiments during live in-person events and live streaming events 300 provides the alert so that the user receive a query alert ("receive query alert" at 315). Next, the live event user sentiment query and submission process for querying, submitting, and sharing live in-person sentiments during live in-person events and live streaming events 300 includes a step to access a host query (at 320) and the user then responds to the query (at 325). For example, the user responds to the query with his or her own personal sentiments in regard to one or another issue discussed during the live event. The live event user sentiment query and submission process for querying, submitting, and sharing live in-person sentiments during live in-person events and live streaming events 300 concludes upon received confirmation (at 330) from the user.

Similarly, to submit user sentiments (at 310) when the user has selected the streaming/virtual live event (at 250) and selected the option to view the streaming/viral live event (at 270), then the live event user sentiment query and submission process for querying, submitting, and sharing live in-person sentiments during live in-person events and live streaming events 300 starts to stream the live event for viewing by the user (at 335). Then the user responds to a query embedded within the live event stream (at 340). For example, the user submits sentiments about an ongoing issue. Then the live event user sentiment query and submission process for querying, submitting, and sharing live in-person sentiments during live in-person events and live streaming events 300 concludes upon receiving the user's confirmation (at 345).

In some embodiments, the live event user sentiment query and submission process for querying, submitting, and sharing live in-person sentiments during live in-person events and live streaming events 300 publicly shares live in-person sentiments (at 350) by way of a plurality of mobile device swipe screens 355. The plurality of mobile device swipe screens 355 includes at least two swipe screens or perhaps more (e.g., mobile device swipe screens "A" through "E" or more). The swipe screens 355 are selectable via a query screen option for selection swipes 360 in some embodiments.

Also, the live event user sentiment query and submission process for querying, submitting, and sharing live in-person sentiments during live in-person events and live streaming events 300 of some embodiments allows access to query results analytics 370. The query results analytics 370 includes one or more host data sets. In this example, four host data sets 375 are shown (e.g., host data sets "1", "2", "3", and "4").

Figure 4:
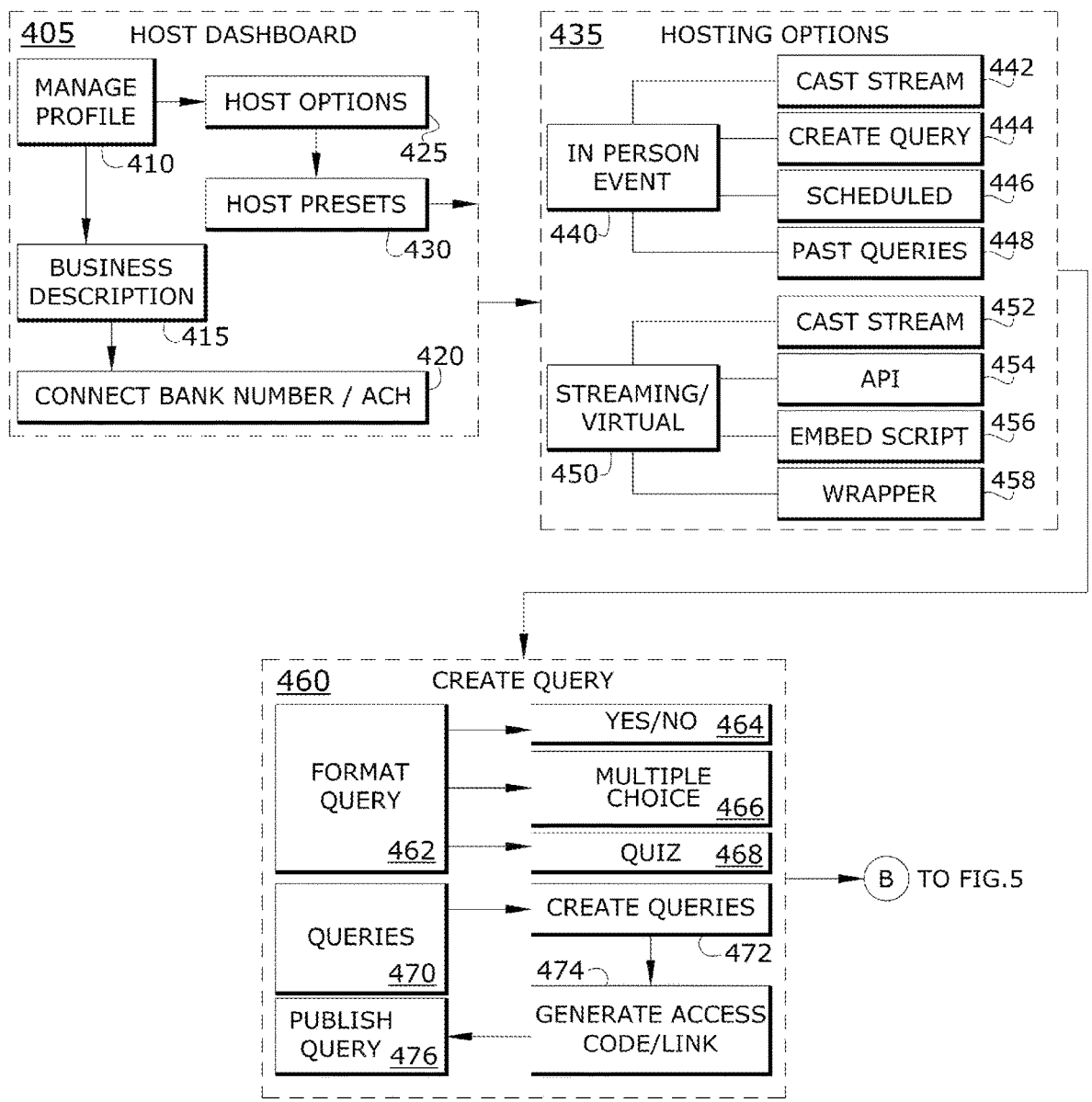
FIG. 4 conceptually illustrates a live event host process for hosting and creating queries for live in-person events and live streaming events in some embodiments.

By way of example, FIG. 4 conceptually illustrates a live event host process for hosting and creating queries for live in-person events and live streaming events 400 in some embodiments. As shown in this figure, the live event host process for hosting and creating queries for live in-person events and live streaming events 400 centers around a host dashboard 405, which provides several hosting options 435 for a host user to select which thereafter enables the host user to create a query 460. In the host dashboard 405, the host user may manage a host user profile (at 410), such as adding, updating, or changing a business description (at 415) and connecting a bank number/ACH number (at 420) for paid live events. The host dashboard 405 also allows the host user to select host options (at 425) and host presets (at 430), which then presents several hosting options 435.

In the hosting options 435, the host user may select an in-person live event (at 440) or a streaming/virtual live event (at 450), each of which presents several different hosting options for the host user to select. If and when the host user selects the in-person live event (at 440), the hosting options 435 are presented for the host user to cast a stream (at 442) of the in-person live event, create a query (at 444) for collecting user sentiments about a topic in the in-person live event, view scheduled in-person live events (at 446), and view past queries (at 448).

On the other hand, if and when the host user selects the streaming/virtual live event (at 450), the hosting options 435 are presented for the host user to cast a stream (at 452) of the streaming/virtual live event, access an application programming interface (API) to enhance scripts or modify queries, etc., for the streaming/virtual live event (at 454), embed a script (at 456) into the live stream for the streaming/virtual live event, and enclose the streaming/virtual live event in a wrapper (at 458).

Besides the several hosting options 435 which the host user may access, select, and otherwise set or configure, the live event host process for hosting and creating queries for live in-person events and live streaming events 400 enables the host user to create a query (at 460). If a query is already created, the host user may selection an option to format the query (at 462). The query format is based on selections to format the query presentation, such as formatting the query to be in a "YES/NO" format (at 464), formatting the query to present multiple choice questions to the user (at 466), formatting the query to present a quiz to the user (at 468), etc. On the other hand, the host user may wish to create a new query, regardless of whether or not any existing queries are available for selection and modification. To create a query (at 460), the host user may select a queries option (at 470) followed by a selection to create queries (at 472). Then the host user generates an access code and/or link (at 474) for the newly created query and proceeds to publish the query (at 476). After a query is published, it is available to users in a live event to be launched. For instance, when a user is at a live event in person, the user may interface with an in-person live event computer platform to provide sentiments via queries targeted for the live in-person event. Similarly, if the user is not live at a location of the event, the user may answer queries associated with a live streaming/virtual event via connection to the web-based cloud application service from a mobile device running a mobile app or a browser with access to the platform. Launching queries and customizing live in-person sentiment sharing, as well as publishing query results and analytics, are described next, by reference to FIG. 5.

Figure 5:
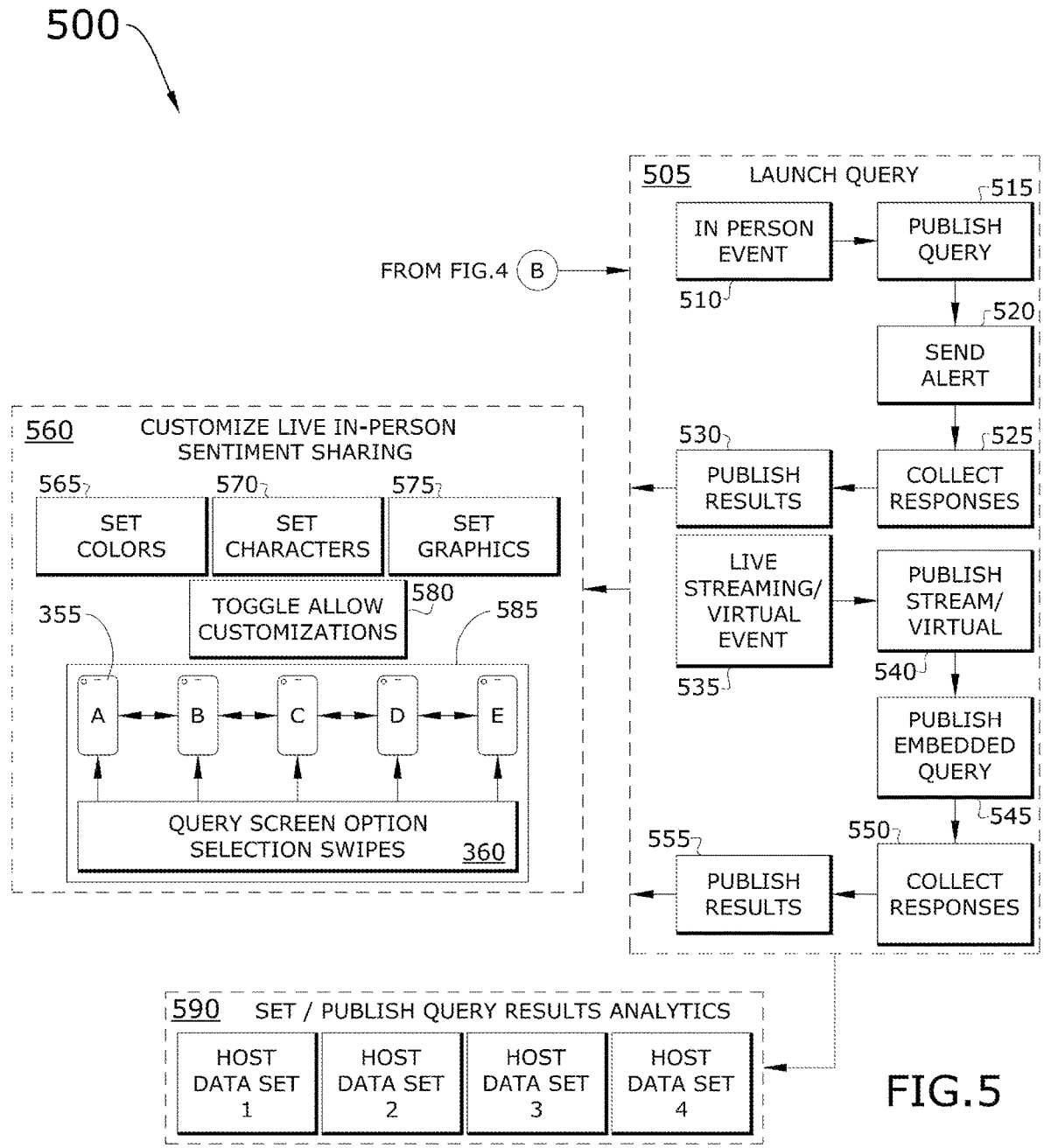
FIG. 5 conceptually illustrates a live event host querying process for publishing queries and query response results and analytics during live in-person events and live streaming events in some embodiments.

Specifically, FIG. 5 conceptually illustrates a live event host querying process for publishing queries and query response results and analytics during live in-person events and live streaming events 500 in some embodiments. As shown in this figure, the live event host querying process for publishing queries and query response results and analytics during live in-person events and live streaming events 500 enables the user to launch a query (at 505) in connection with a live in-person event (at 510) or a live streaming/virtual event (at 535). For instance, a live in-person event may be scheduled for a particular day/time and the host user may wish to obtain feedback from individuals through one or more queries built for the purpose or focus of the live in-person event (and likewise with a live streaming/virtual events).

When connected to a live in-person event (at 510), the live event host querying process for publishing queries and query response results and analytics during live in-person events and live streaming events 500 publishes the query (at 515).

In some embodiments, a published query is a query that is ready for user review and configured to accept user responses. Thus, the live event host querying process for publishing queries and query response results and analytics during live in-person events and live streaming events 500 notifies users of the published query (at 515) by sending an alert (at 520) about the query. Then the live event host querying process for publishing queries and query response results and analytics during live in-person events and live streaming events 500 moves to a phase in which response data is collected (at 525) from user interaction with the query. Although the live event host querying process for publishing queries and query response results and analytics during live in-person events and live streaming events 500 presents this as a single step to collect responses, in actual practice, the step for collecting responses (at 525) may not be finalized by a single action, but instead may last for a longer duration of time. For instance, the collecting of responses (at 525) may be set for a particular time duration (or rather, an open period of time for responding to the query), during which several users submit responses to the published query for the live event and which is cut off (finalized) at a specific later time. Similarly, the step for collecting responses (at 525) may have an open ended period of time without a set cut-off time but may instead use a monitor (such as a script that automatically monitors for query responses) which triggers response collection (at 525) after a certain period of time without receiving any response data from any user for the published query. In any event, after the responses are collected (at 525), the live event host querying process for publishing queries and query response results and analytics during live in-person events and live streaming events 500 of some embodiments publishes the results (at 530).

Now referring to a live streaming/virtual event (at 535), the live event host querying process for publishing queries and query response results and analytics during live in-person events and live streaming events 500 publishes the live stream/virtual event (at 540) and contemporaneously publishes an embedded query (at 545) for the live stream/virtual event. Like the published query (at 515) for the live in-person event (at 510), the published embedded query (at 545) is a query that is ready for user review and configured to accept user responses in connection with the live stream/virtual event (at 535). Next, the live event host querying process for publishing queries and query response results and analytics during live in-person events and live streaming events 500 collects responses (at 550) input by users for the published embedded query (at 545). Like the response collection phase (at 525) connected to the live in-person event (at 510), the collection of responses (at 550) for the embedded query (at 545) published for the live streaming/virtual event (at 535) may not happen instantaneously, but instead, may proceed over a duration of time or until a threshold number of responses are collected, or some other criteria for determining when to finalize the response collection period. Whatever the period of time may entail, after the responses are collected (at 555), the live event host querying process for publishing queries and query response results and analytics during live in-person events and live streaming events 500 then publishes the results (at 555).

In some embodiments, the live event host querying process for publishing queries and query response results and analytics during live in-person events and live streaming events 500 provides the ability to customize live in-person sentiment sharing (at 560). To customize live in-person sentiment sharing (at 560), the live event host querying process for publishing queries and query response results and analytics during live in-person events and live streaming events 500 enables users to set colors (at 565), set characters (at 570), and set graphics (at 575). In some embodiments, the live event host querying process for publishing queries and query response results and analytics during live in-person events and live streaming events 500 provides a toggle (switch) that enables a user to allow or prevent customization (at 580) for live in-person sentiment sharing. Furthermore, the live in-person sentiment sharing customization (at 560) provides a plurality of preview mobile screens 585, such as mobile device swipe screens 355, in which the mobile screens 585 (or swipe screens 355) are selectable by way of the query screen option for selection swipes 360.

In some embodiments, the live event host querying process for publishing queries and query response results and analytics during live in-person events and live streaming events 500 sets and publishes query results analytics (at 590), providing access to host data sets (such as "HOST DATA SET 1", "HOST DATA SET 2", "HOST DATA SET 3", "HOST DATA SET 4", etc.).

Figure 6:
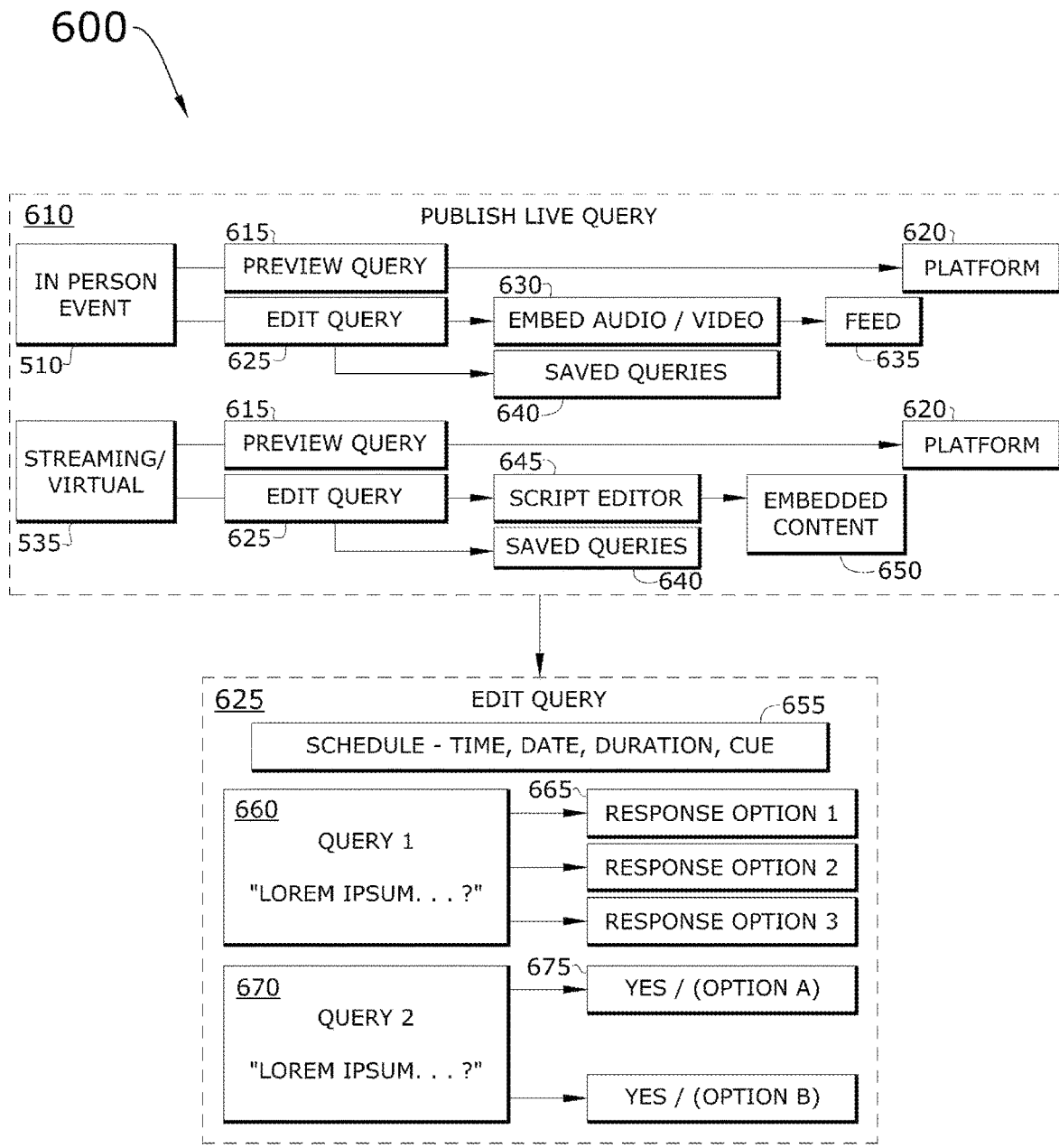
FIG. 6 conceptually illustrates a live query process for publishing and editing queries for live in-person events and live streaming events in some embodiments.

Now turning to another example, FIG. 6 conceptually illustrates a live query process for publishing live queries (at 610) and editing queries (at 625) for live in-person events and live streaming events 600 in some embodiments. Publication of a live query, as noted above, can happen in connection with a live in-person event (at 510) or a live streaming/virtual event (at 535). To publish a live query (at 610) in connection with the live in-person event (at 510), the live query process for publishing and editing queries for live in-person events and live streaming events 600 starts by previewing the query (at 615) and, if the query is satisfactory with respect to the preview, publishing and providing the query to the platform (at 620). However, if the query is not satisfactory with respect to the query preview (at 615), the live query process for publishing and editing queries for live in-person events and live streaming events 600 proceeds to a step for editing the query (at 625), which is described in further detail below. Editing the query can involve a script editor (at 645) and embedded content (at 650) or may involve loading saved queries (at 640).

As for editing the query (at 625), the live query process for publishing and editing queries for live in-person events and live streaming events 600 provides a query schedule tool (at 655) in which selections for time, date, duration, cue(s), etc., can be set for the query. Also, editing the query (at 625) can be include edits that conform with different formulated queries, such as a first query formulation (at 660) which presents query items as question/response options (at 665). For instance, the query can conform to the first query formulation by providing user selectable response options 1, 2, and 3 in connection with a query question. Another type of formulation is shown as a second query formulation (at 670) in which the query provides affirmation of one or more options 675 by a 'YES' response. For instance, multiple options in which any 'YES' response to an option is consider an affirmation of a part of an entirety of the query, e.g., 'YES/OPTION A' or 'YES/OPTION B.' While the options for formulating queries and response inputs is by no means limited to these examples, the ability to edit queries (at 625) allows for greater control over the polling data/response data intended to be collected in connection with any live event.

Figure 7:
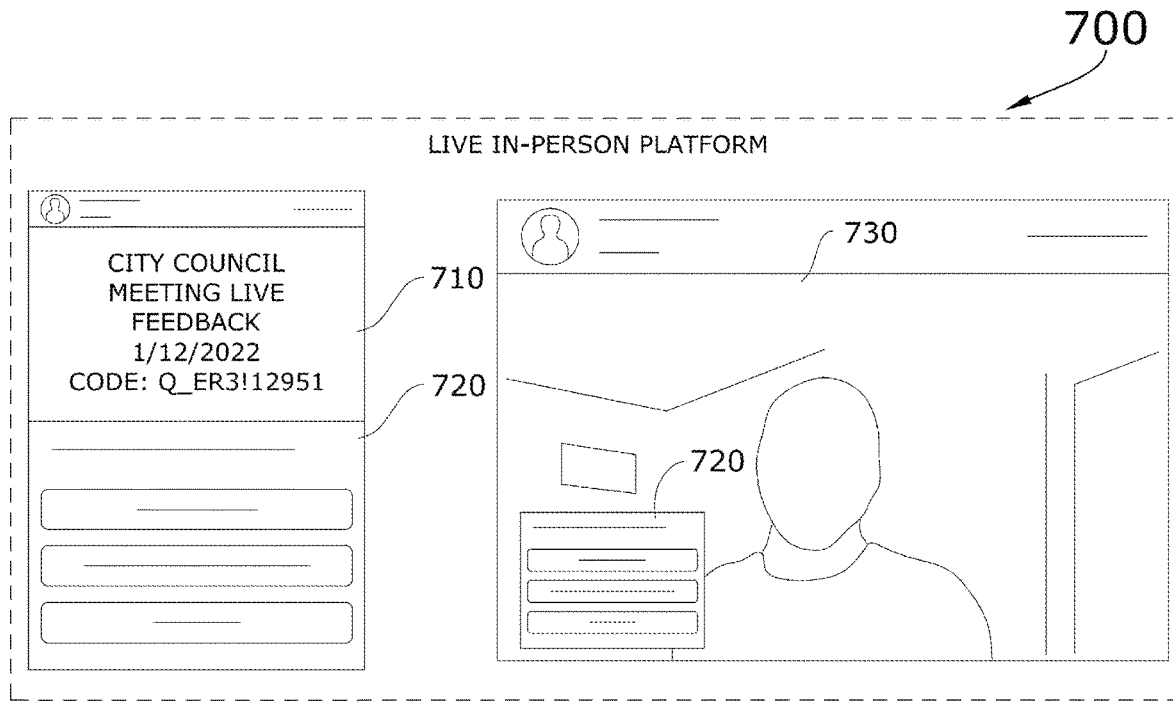
FIG. 7 conceptually illustrates a live in-person event polling platform in some embodiments.

By way of example, FIG. 7 conceptually illustrates a live in-person event polling platform 700 in some embodiments. The live in-person event polling platform 700 may be deployed on a workstation computer located on-site at a location of the live in-person event. As shown in this figure, the live in-person event polling platform 700 includes information about the live in-person event 710, a live in-person event query 720, and a view of a camera/screen 730 (or a cast view of the camera/screen 730 if camera is located away from the computer workstation for polling). Specifically, the information about the live in-person event 710 shown in this figure includes a description, a date, and a code, and may also include other information, such as live content, a logo, etc.

Figure 8:
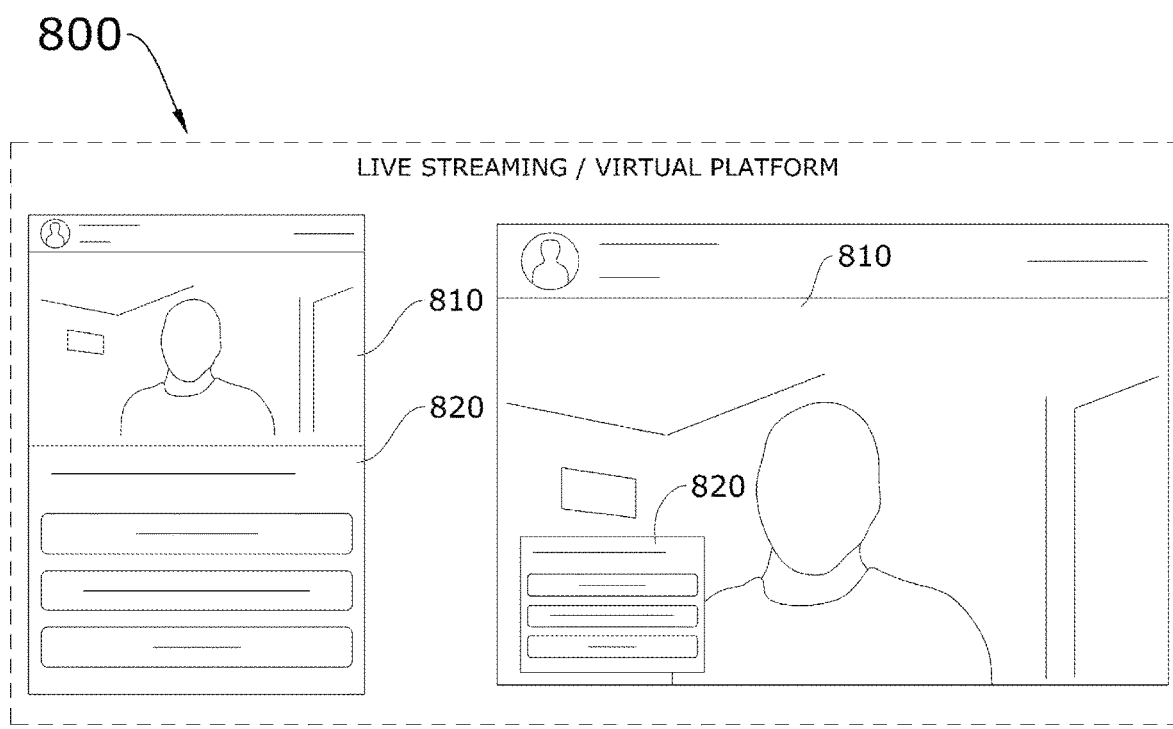
FIG. 8 conceptually illustrates a live streaming event virtual polling platform in some embodiments.

By way of another example, FIG. 8 conceptually illustrates a live streaming event virtual polling platform 800 in some embodiments. The live streaming event virtual polling platform 800 may be published as a stream via the cloud application service in connection with a live streaming/virtual event. As shown in this figure, the live streaming event virtual polling platform 800 includes embedded camera/screen and virtual/wrapper content 810 and a live streaming/virtual event query 820.

Figure 9:
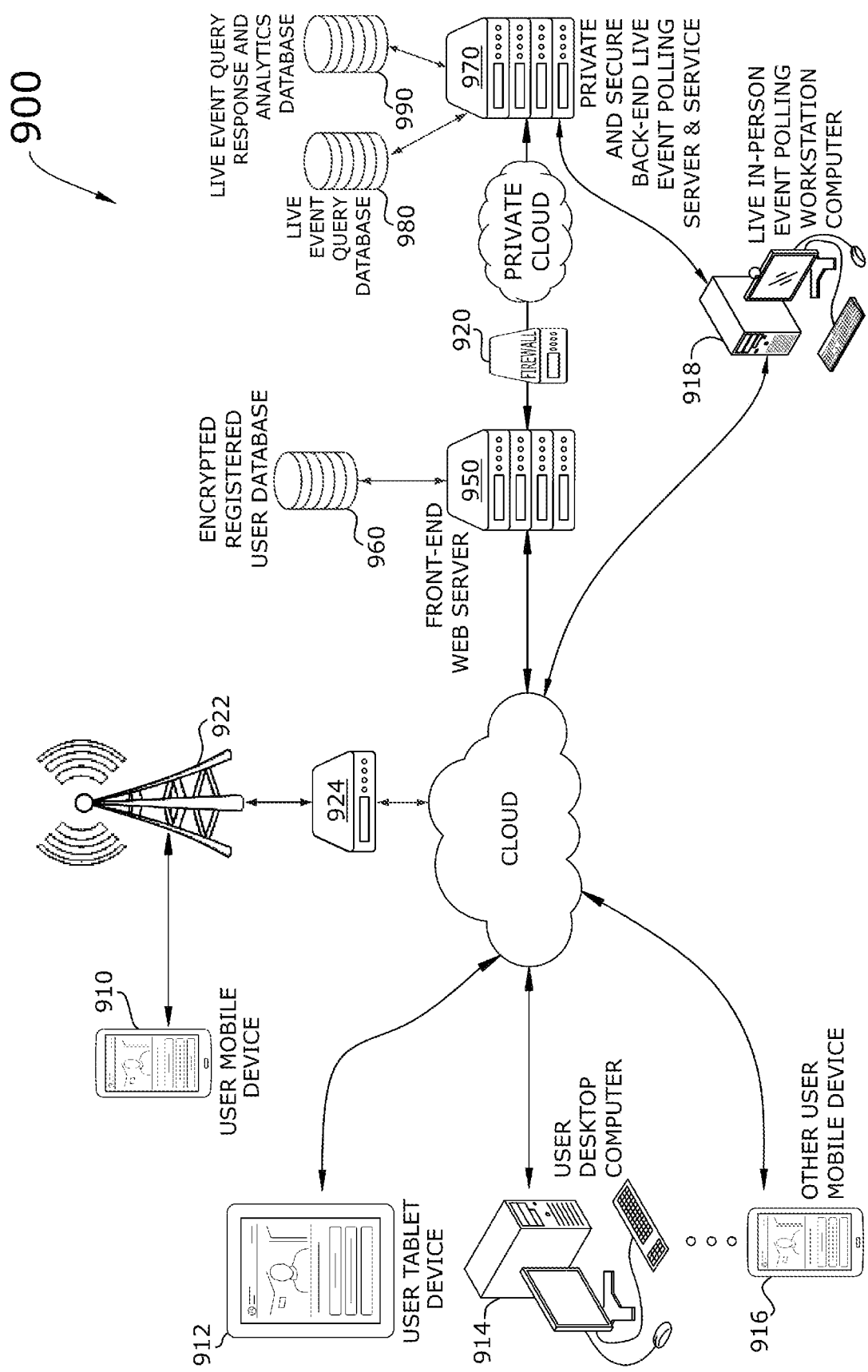
FIG. 9 conceptually illustrates a network architecture of a cloud-based live event polling system in some embodiments.

By way of example, FIG. 9 conceptually illustrates a network architecture of a software-as-a-service (SaaS) cloud-based live event polling system 900 that hosts a live event polling cloud application service that is configured to provide a live event polling platform for users to connect to live in-person and streaming events and submit sentiment responses to queries. As shown in this figure, the live event polling system 900 includes a set of user computing devices 910-916, a live in-person polling platform workstation computer 918, a firewall 920, a wireless communication point 922 (e.g., a cell tower for cellular data communication), a gateway 924, a front-end web server 950 that publishes a live event polling website (for connections made by browsers) and provides a live event polling application portal gateway site (for connections made by computing devices running the live event polling application), an encrypted registered user database 960, a private and secure back-end live event polling server 970 that hosts the cloud application service, a live event query database 980, and a live event query response and analytics database 990 for storing response data collected from users in connection with queries during the live events. In some embodiments, the live event polling system 900 includes access to third party cloud services (not shown here).

Many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
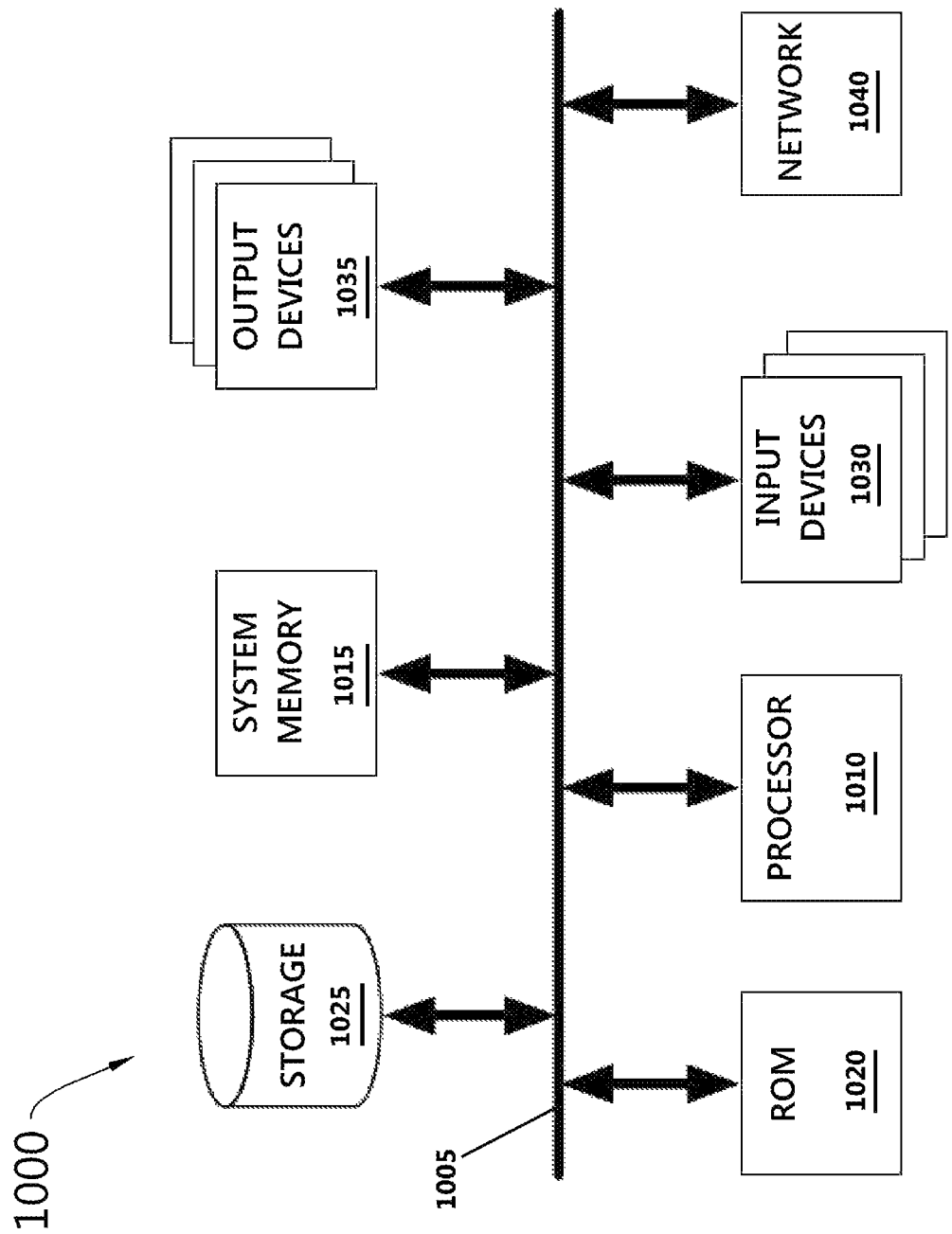
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, phone (cell phone, mobile phone, smartphone, etc.), PDA (digital assistant device, etc.), tablet computing device, single board computer (SBC), server, or any other sort of electronic device or computing device. Such an electronic system includes various types of computer readable media and interfaces for various other types of computer readable media. Electronic system 1000 includes a bus 1005, processing unit(s) 1010, a system memory 1015, a read-only memory 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025. From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only memory 1020. For example, the various memory units include instructions for processing appearance alterations of animal temperature. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as liquid crystal displays (LCD) or organic light emitting diode (OLED) displays. Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General purpose and special purpose computing and storage devices can be interconnected through communication networks.

Some embodiments include electronic components, such as microprocessors, storage and memory that store computer program instructions in a machine-readable or computer-readable medium (alternatively referred to as non-transitory computer readable media, computer-readable storage media, machine-readable media, machine-readable storage media, or simply as media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A live event polling system comprising:
a private and secure back-end live event polling server;
a live event query database that is configured to store data formulations of queries associated with live events;
a live event query response and analytics database that is configured to store query response data associated with particular queries for particular live events and analytics data based on analyses of the query response data;
a cloud-based web service that is hosted by the private and secure back-end live event polling server and is configured to (i) provide micro-polling services for live in-person events, (ii) provide micro-polling services and streaming services for live streaming events, (iii) publish queries created for live events, (iv) collect query response data in connection with the published queries, and (v) store the query response data in the live event query response and analytics database;
a platform dashboard that is accessible to registered users through the cloud-based web service and is configured to enable registered users to make profile selections, join live events, and host live events; and
a user device operated by a particular user, wherein the user device is configured to run a live event polling application that accesses the cloud-based web service when the user device establishes a network connection to the private and secure back-end live event polling server, wherein the live event polling application is configured to visually output an end-user dashboard through which the particular user can search for and join a particular live streaming event streamed by the cloud-based web service, wherein the live event polling application is further configured to visually output the platform dashboard through which the particular user can select from a plurality of live event options comprising (i) a join event option which, when selected by the particular user, runs a join event script for the particular user to join live events and (ii) a host live event option which, when selected by the particular, runs a host event script for the particular user to create and host a user-hosted live streaming event streamed by the cloud-based web service to a plurality of participant devices operated by a plurality of other event participants, wherein the platform dashboard is further configured for creation of host queries by the particular user after the user-hosted live streaming event is created, wherein host queries poll the plurality of other event participants for sentiment responses, wherein the particular user creates and embeds a particular host query in the user-hosted live streaming event.

2. The live event polling system of claim 1 further comprising a front end web server that is configured to process user registration and authenticate registered users via login credentials, wherein the user device establishes the network connection to the private and secure back-end live event polling server by connecting to the front end web server.

3. The live event polling system of claim 2, wherein the live event polling application is configured to detect whether the particular user is a registered user of the cloud-based web service when the user device connects to the front end web server.

4. The live event polling system of claim 3, wherein the live event polling application is configured to visually output a user registration form when the particular user is not a registered user of the cloud-based web service.

5. The live event polling system of claim 4 further comprising an encrypted registered user database that is communicably connected to the front end web server.

6. The live event polling system of claim 5, wherein the live event polling application is configured to receive user registration form data input by the particular user and store the received user registration form data in the encrypted registered user database.

7. The live event polling system of claim 3, wherein the live event polling application is configured to visually output a user login screen when the particular user is a registered user of the cloud-based web service.

8. The live event polling system of claim 1, wherein the embedded particular host query is accessible to the plurality of other event participants while the user-hosted live streaming event is streamed by the cloud-based web service.

9. The live event polling system of claim 8, wherein the embedded particular host query is configured to solicit sentiment response data from the plurality of other event participants during the user-hosted live streaming event.

10. The live event polling system of claim 9, wherein the live event polling application is configured to solicit sentiment confirmation when any participant in the plurality of other event participants provides a sentiment response to the embedded particular host query, wherein the live event polling application provides a query swipe screen option to confirm the provided sentiment response, wherein the live event polling application is further configured to share the confirmed sentiment response data with the particular user hosting the user-hosted live streaming event and the plurality of other event participants streaming the user-hosted live streaming event.

11. The live event polling system of claim 9, wherein the live event polling application is configured to transmit the confirmed sentiment response data to the cloud-based web service for collection of all confirmed response data in association with the user-hosted live streaming event.

12. The live event polling system of claim 1, wherein the live event polling application comprises a query editing tool that is configured to visually output tools for the particular user to edit the host queries created for live events, wherein the cloud-based web service is further configured to store data formulations of newly created and edited host queries in the live event query database.

13. The live event polling system of claim 1 further comprising a live in-person event polling workstation computer that is configured to connect to the private and secure back-end live event polling server to provide micro-polling services for a particular live in-person event.

14. The live event polling system of claim 13, wherein the live in-person event polling workstation computer is further configured present a query during the particular live in-person event and collect query response data input into the live in-person event polling workstation computer by users at the particular live in-person event.

15. The live event polling system of claim 14, wherein the live in-person event polling workstation computer is configured to transmit the collected query response data to the private and secure back-end live event polling server to store in the live event query response and analytics database.

* * * * *